United States Patent [19]

Culley

[11] 3,805,146

[45] Apr. 16, 1974

[54] VOLTAGE FOLLOWER WITH MATCHED FIELD EFFECT TRANSISTORS AND MATCHED CURRENT AMPLIFYING TRANSISTORS FOR CAPACITOR CHARGING

[75] Inventor: John Edward Culley, Kidderminster, England

[73] Assignee: Imperial Metal Industries (Kynoch) Limited, Birmingham, England

[22] Filed: Feb. 5, 1973

[21] Appl. No.: 329,339

[30] Foreign Application Priority Data

Feb. 10, 1972 Great Britain .................... 6358/72

[52] U.S. Cl. .................. 323/16, 307/235, 307/267, 320/1, 328/151

[51] Int. Cl. .............................. H03k 5/18

[58] Field of Search .................. 307/235, 265, 267; 328/151; 330/30 D; 320/1; 323/16

[56] References Cited

UNITED STATES PATENTS

| | | | |
|---|---|---|---|
| 3,375,501 | 3/1968 | McCutcheon et al. | 328/151 X |
| 3,469,112 | 9/1969 | Hands et al. | 307/235 X |
| 3,553,492 | 1/1971 | Bugay | 307/235 |

*Primary Examiner*—Gerald Goldberg
*Attorney, Agent, or Firm*—Cushman, Darby & Cushman

[57] ABSTRACT

A voltage follower comprising a pair of matched field effect transistors, a pair of matched current amplifying transistors controlled by the field effect transistors, and a capacitor to be charged by one of the current amplifying transistors to a voltage corresponding to that of an input of one of the field effect transistors.

11 Claims, 5 Drawing Figures

VOLTAGE FOLLOWER WITH MATCHED FIELD EFFECT TRANSISTORS AND MATCHED CURRENT AMPLIFYING TRANSISTORS FOR CAPACITOR CHARGING

BACKGROUND OF THE INVENTION

This invention is concerned with voltage followers and is particularly, but not exclusively, directed to a voltage follower which is capable of receiving and stretching pulses of voltage which are of short duration and may vary in amplitude from one pulse to the next.

SUMMARY OF THE INVENTION

In accordance with the present invention, a voltage follower comprises a first field effect transistor of which the gate is to receive the voltage to be monitored, a second field effect transistor which is matched with the first field effect transistor, a constant current generator connected to a coupling between the sources of the field effect transistors, a first current amplifying transistor of which the base is controlled by the drain of the first field effect transistor, a second current amplifying transistor which is matched with the first current amplifying transistor and of which the base is controlled by the drain of the second field effect transistor, a common current supply to the coupled emitters of the first and second current amplifying transistors, a capacitor of which one terminal is connected to a constant voltage and of which the other terminal is connected to the gate of the second field effect transistor and is connected through a diode to be charged by the collector of the first current amplifying transistor, a current drain connected to the collector of the first current amplifying transistor, a connection from the collector of the second current amplifying transistor to a voltage of lower magnitude than or of the opposite sense to the voltages of the emitter or base of the second current amplifying transistor, and means for measuring the voltage developed across the capacitor.

Preferably the base of each current amplifying transistor is also connected to a more positive voltage through respective and equal resistors.

Preferably also, means are provided to balance the coupled field effect transistors and their respective resistors just mentioned.

Preferably also, said balancing is provided by the use of a potentiometer of which the slider is connected to a positive supply and the opposite ends of the resistance track are coupled to the equal resistors.

Preferably further, the first and second current amplifying transistors are supplemented by emitter follower transistors of which the emitters are connected to a common and constant voltage through respective and equal resistors, said voltage being more positive than that of the bases of the first and second current amplifying transistors for emitter follower transistors which are PNP transistors, and more negative than that of the bases of the first and second current amplifying transistors for emitter follower transistors which are NPN transistors.

Preferably also, the connection between the diode and the collector of the first current amplifying transistor is also connected to earth through a by-pass NPN transistor of which the base can be energised to provide conductivity and therefore by-pass charging pulses to the capacitor.

Preferably also, means are provided for reducing the magnitude of the charging pulse between the connection to the by-pass transistor and the diode whereby upon operation of the by-pass transistor, the diode is always presented with a negative signal to provide reverse biassing. Said means may be a diode or a NPN current amplifying transistor of which the base is connected to the collector of the first current amplifying transistor, the emitter is connected to the diode, and the collector is connected to a positive voltage greater than the voltage of the emitters of the first and second current amplifying transistors. Preferably the emitter of said NPN current amplifying transistor is connected through a current drain to a negative voltage to maintain the emitter negative when the by-pass transistor is conductive.

BRIEF DESCRIPTION OF THE DRAWINGS

A typical embodiment of the invention, and modifications thereof, will now be described with reference to the accompanying circuit diagrams in which.

DESCRIPTION OF THE PREFERRED EMBODIMENTS

Figure 1:
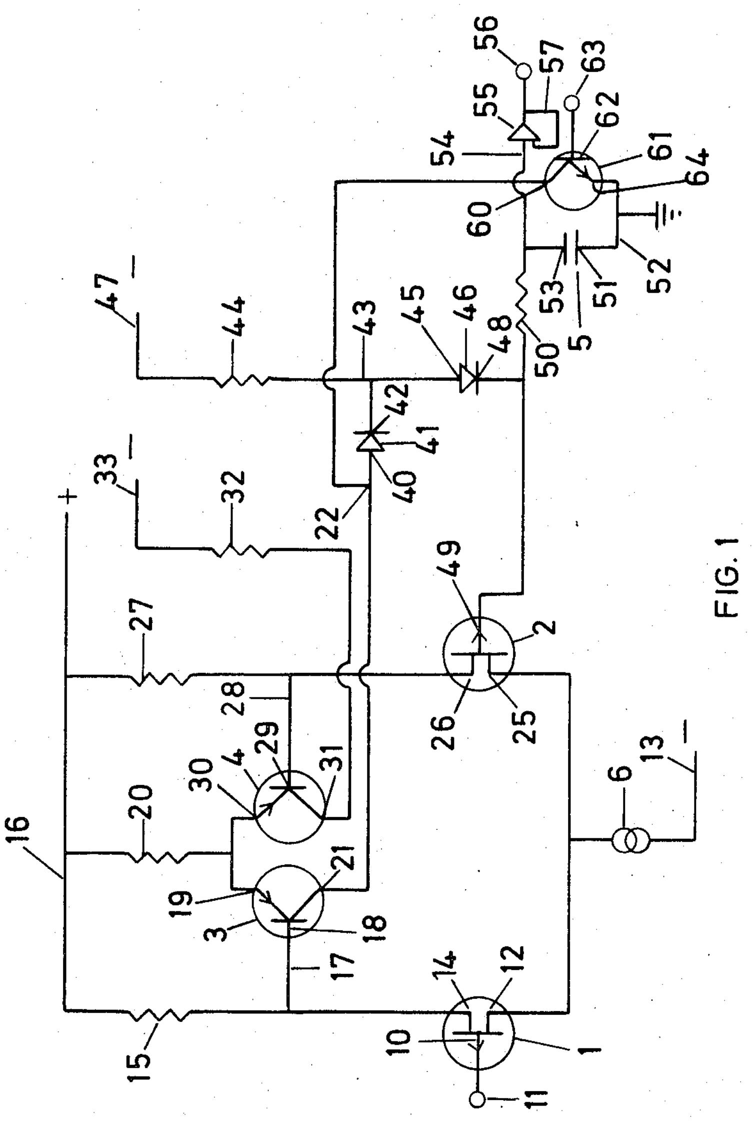
FIG. 1 is a circuit diagram of a voltage follower in accordance with the embodiment.

Referring initially to FIG. 1, this shows the circuit of a voltage follower in which as basic components there are provided two matched P-channel field effect transistors 1,2, two matched PNP current amplifying transistors 3 and 4, a capacitor 5, and a constant current generator 6. The field effect transistors 1,2 should preferably be matched to the degree of having less than 5 millivolts difference in the voltage between the source and gate of each transistor, this being with a current flow of 1 milliampere through each transistor. The current amplifying transistors 3,4 should have their current gains equal to within 10 percent, and preferably 2 percent. The current gain is the collector current divided by the base current and is typically of the order of 150. These components are interconnected as will now be more fully described, again with reference to FIG. 1.

FIG. 1 shows the first field effect transistor 1 of which the gate 10 is connected to an input terminal 11 to be supplied with pulses of voltage of which the magnitudes are to be monitored and eventually measured. The source 12 of the first field effect transistor is connected to the constant current generator 6 which operates from a negative line 13. The voltage to be applied to the negative line 13 will be discussed later. The drain 14 of the first field effect transistor 1 is connected through a resistor 15 to a positive line 16.

Between the drain 14 and the resistor 15 the connection 17 leads to the base 18 of the first current amplifying transistor 3 of which the emitter 19 is connected through a resistor 20 to the positive line 16. The collector 21 of the first current amplifying transistor 3 is connected to a junction 22 from which follows further circuitry described below.

The output from the constant current generator 6 is also connected to the source 25 of the second of the matched field effect transistors 2. The drain 26 of the field effect transistor 2 is connected to the positive line 16 through a resistor 27 having the same resistance as that of the resistor 15. Between the drain 26 and the resistor 27, there is a connection 28 to the base 29 of the second current amplifying transistor 4 of which the emitter 30 is, in common with the emitter 19 of the first transistor 3, connected to the resistor 20. The collector 31 of the second current amplifying transistor 4 is connected through a resistor 32 to a negative line 33 to be maintained at a voltage of lower magnitude than the voltages of the emitter 30 or base 29 of the second current amplifying transistor 4, whereby a constant negative drain is available to the collector 31.

The junction 22 referred to above is connected to the input 40 of a diode 41 of which the output 42 is connected to a junction 43 between a resistor 44 and the input 45 of a second diode 46. The resistor 44 leads to a negative line 47. The output 48 of the second diode 46 is connected to the gate 49 of the second field effect transistor 2, and to a resistor 50. The capacitor 5 has one terminal 51 connected to an earth line 52, and has its other terminal 53 connected to the resistor 50 and to the input 54 of a voltage follower 55 which, using the voltage upon said other terminal 53 of the capacitor 5, can provide a supply of current at that voltage at an output terminal 56 without significantly reducing the voltage on the capacitor 5. As shown in FIG. 1, the voltage follower 55 is an amplifier connected with negative feed-back as shown diagrammatically by the line 57.

Returning to junction 22, this is also connected to the collector 60 of an NPN transistor 61 of which the base 62 is connected to a terminal 63 for a purpose to be described, and of which the emitter 64 is connected to earth, typically the earth line 52.

In operation, the input terminal 11 is connected to a source of voltage which is to be followed and measured and thereby presented at the output terminal 56. Typically the voltage appearing at the input terminal 11 is a series of spaced groups of pulses of which the peak voltage developed during each pulse is to be stretched and measured. Accordingly the circuitry should be capable of following the voltages developed during each group of pulses, and presenting at the output terminal 56 the maximum that is reached, this being at that particular voltage and also being capable of being drawn upon, ie by having substantial current available at that voltage.

The operation of the circuitry will be described in detail, assuming initially that the system is quiescent except for the operation of the constant current generator 6.

The appearance of a pulse at the input terminal 11 renders the first field effect transistor 1 more conductive whereby more current can flow from the positive line 16 through the drain 14 and the source 12 of the first field effect transistor, and through the constant current generator 6 to the negative line 13. The magnitude of this current depends upon the voltage at 11. The current flowing through the first field effect transistor is composed partly by the current flowing through the resistor 15, and partly also by the current flowing along the connection 17 from the base 18 of the first current amplifying transistor 3. The effect of the greater current flowing through the resistor 15 is that the voltage appearing at the drain 14 and also the base 18 will be lowered, whereby the first current amplifying transistor 3 will amplify the current flowing therethrough from the positive line 16 through the resistor 20 and produced upon the collector 21. This current will flow through the junction 22, the diodes 41 and 46, the resistor 50, and will then commence to charge the capacitor 5.

However, the voltage at the output 48 of the diode 46 will also appear at the gate 49 of the second field effect transistor 2, whereby that transistor will become more conductive to pass greater current from the positive line 16 through the resistor 27 and the constant current generator 6 to the negative line 13. In a similar way to the effect of the current from the drain 14 of the first field effect transistor 1, increased current flow through the resistor 27 will reduce the potential of the connection 28 and hence the base 29 of the second current amplifying transistor 4, so that the transistor 4 will amplify current which will flow from the collector 31 through the resistor 32 to the negative line 33. The coming into operation of the second field effect transistor 2 has two effects. The first of these is that the constant current generator 6 has its named function, i.e., the current flowing through the second field effect transistor will reduce the current available to flow through the first field effect transistor 1, so that the reduced flow of current through the resistor 15 will permit the potential of the base 18 to rise, whereby less current amplification is produced by the first current amplifying transistor 3 and thereby less current is available for charging the capacitor 5. The second effect is that the operation of the second current amplifying transistor 4 will reduce the current available through the resistor 20 to the emitter 19 of the first current amplifying transistor 3. Accordingly the current available from the collector 21 of the first amplifying transistor reduces until there is no current flow into the resistor 50 when the voltages upon the gates 10 and 49 of the field effect transistors 1 and 2 are equal. Until that stage is reached, there is ample supply of current available from the collector 21 to charge the capacitor 5, limited only by the current available through resistor 20 to the first current amplifying transistor 3.

Through the resistor 50 the capacitor 5 charges to the same level as the voltage upon the gate 49, and hence upon the gate 10, and this voltage is measured by the voltage follower 55 so that the maximum voltage reached during each group of pulses is presented at the output terminal 56.

The circuit embodies various safeguards which either improve the operation or the efficiency of the equipment. In particular, the description of function which has just been given makes no reference to the transistor 61. The transistor 61 is a by-pass transistor and is coupled between the junction 22 and earth, and is rendered conductive by a positive input at its terminal 63 to its base 62. Operation of the by-pass transistor 61 by the input of such a voltage can be used to effectively form a short-circuit between the junction 22 and earth, ie preventing any further charge upon the capacitor 5; it will be noted that the diode 46 will in this event prevent rapid discharge of the capacitor 5 through this short-circuit, this diode 46 being reverse-biassed by the current flow from the earth line 52 through the diode 41 and the resistor 44 to the negative line 47. This is operative when within a group of pulses it is desired that only a part thereof is to be monitored, ie from the equipment initiating the pulses a voltage can be connected to the input terminal 63 during the time when pulses are being received by the input terminal 11 of which their peak voltage is not to be measured. This is described more fully below.

The presence of the resistor 50 has the effect that whilst charging current is passing therethrough to the capacitor 5, there will be a difference in potential between the two ends of the resistor 50. Accordingly the voltage at the capacitor 5 lags behind the voltage at the output 48 of the diode 46 to a degree depending upon the charging current, and only slowly are these two voltages matched. This allows for any delay in the functioning of the balancing field effect transistors 1 and 2, and the current amplifying transistors 3 and 4, and prevents the voltage to which the capacitor 5 is charged from overshooting the maximum voltage occurring at the input terminal 11.

When the capacitor 5 has reached a voltage of equal magnitude to that on the input terminal 11, this is available at the output terminal 56 from which useful current can be drawn.

When the input terminal 11 receives a reduced voltage, a voltage appears at junction 43 which is less than the voltage on the capacitor 5. Accordingly the diode 46 remains non-conductive and the current supplied to the junction 43 by the current amplifying transistor 3 drains to the negative line 47 through the resistor 44.

When no charge is being offered to the capacitor 5, this will slowly discharge through the resistor 50 and by utilising the leakage currents which can pass in the reverse direction through the diode 46 and thence to the negative line 47 through the resistor 44. The capacitance of the capacitor 5 is normally kept fairly low to enable the capacitor 5 to discharge to approximately half of any given charge level ready for charging by the maximum peak of the next group of pulses to be received by the input terminal 11.

Without prejudice to the present invention, it is believed that the typical embodiment just described is capable of accurately following and measuring very large ranges of voltage appearing on its input terminal 11. In particular, it is thought that voltage ratios of perhaps 60 or even 80db can be sensed with an accuracy of at least ±10 percent. This should also be true for pulses of relatively short durations, for example as low as 200 nanoseconds. Such abilities are of particular interest in the ultrasonic non-destructive testing field, and may also have many other applications where peaking voltages of short duration, with a small period and with large variations need to be followed and measured.

To further exemplify the invention, the description given above will now be supplemented by typical values for the various electrical components therein. Thus the resistors 15 and 27, which must be equal, can be 3.3 KOhms, these being connected to the positive line 16 which is held at 15 volts. The resistor 20 can be 43 Ohms. The negative lines 33 and 47 are preferably identical, both being held at −15 volts. The resistors leading thereto should therefore be of equal resistance, resistors 32 and 44 therefore being 1KOhm. The capacitor 5 can have a capacitance of about 2,200 picoFarads, this lying within the range of 100 to 10,000 picoFarads. The resistor 50 leading thereto can have a resistance of between 10 and 100 Ohms, typically 25 Ohms. The negative line 13 can be held at a voltage of −15 volts with the constant current generator 6 developing a steady current of about 0.6 milliamps. The values given above, coupled with the use of a conventional commercially available diode 46, can give a ratio between the time to discharge the capacitor 5 and the time to charge it of the order of $5 \times 10^5$. Thus selection of the capacitance of the capacitor 5 dictates the magnitudes of the pulse length and the time to which it is stretched by the voltage follower.

Figure 2:
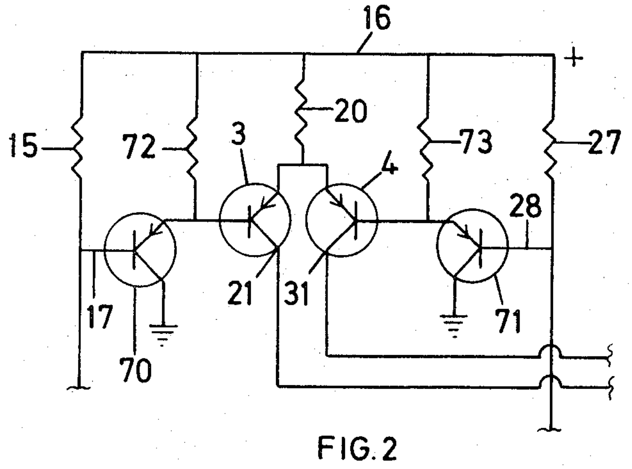
FIG. 2 is a circuit diagram of part of the circuitry shown in FIG. 1 incorporating a first modification thereof.

Reference is now made to FIG. 2 of the accompanying drawings which shows a method of improving the current amplification developed by the current amplifying transistors 3 and 4 in that these are supplemented by PNP emitter followers 70 and 71. The resistors 15, 27 and 20 are maintained at the same resistances as those given above, and the extra resistances 72 and 73 are equal and typically have a magnitude of about 1 KOhm. The collectors of the transistors 70 and 71 are connected to earth.

Figure 3:
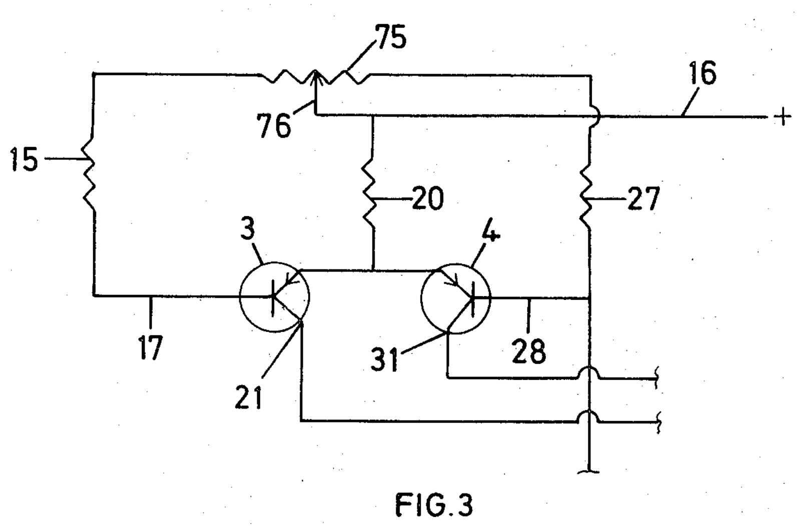
FIG. 3 is a circuit diagram of part of the circuitry shown in FIG. 1 incorporating a second modification thereof.

Referring now to FIG. 3 of the accompanying drawings, this shows a second modification in which the resistances of the resistors 15 and 27 can be finely adjusted to be equal. Thus a potentiometer 75 has its slider 76 connected to the positive line 16, and the resistors 15 and 27 are connected to opposite ends of the track of the potentiometer 75.

Figure 4:
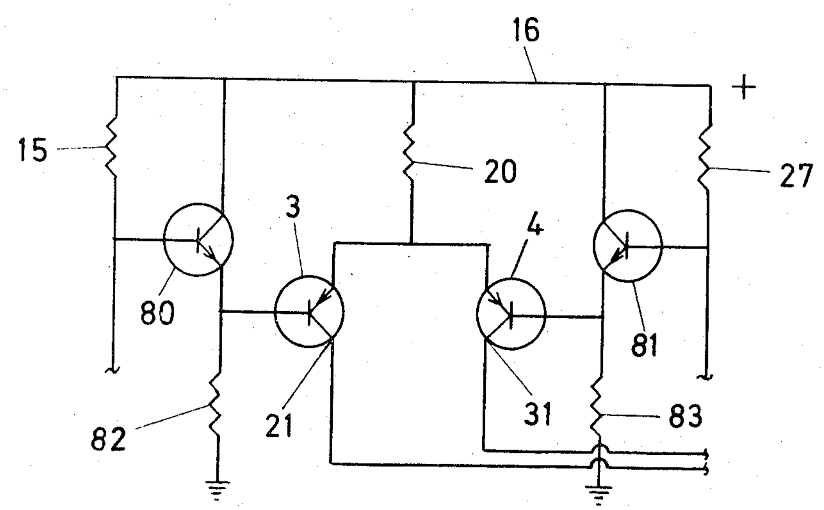
FIG. 4 is a circuit diagram of part of the circuitry shown in FIG. 1 incorporating a third modification thereof.

FIG. 4 shows a third modification of the embodiment which is similar to the modification of FIG. 2 but differs in that instead of PNP emitter followers 70 and 71, there are provided NPN emitter followers 80 and 81 of which the emitters are connected to a common and constant voltage through respective and equal resistors 82 and 83, this constant voltage in this case being earth, so as to be more negative than the voltages of the bases of the first and second current amplifying transistors. The collectors of the NPN transistors 80 and 81 are connected to the positive line 16, and their bases are connected to lines 17 and 28. Typical values for the resistors 82 and 83 are 2.2 KOhms. The use of NPN transistors means that any temperature drift in the characteristics of the first and second current amplifying transistors 3,4 will be opposite to the drift in the NPN transistors 80 and 81. The drifts will therefore tend to cancel one another, whereas with the circuitry of FIG. 2, such drifts would tend to supplement each other by the use of PNP transistors throughout this part of the circuitry.

Figure 5:
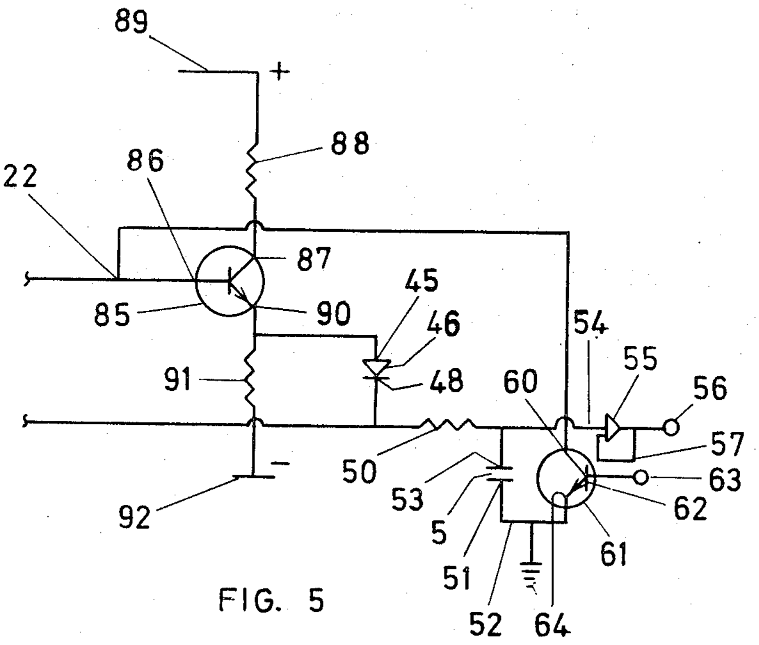
FIG. 5 is a circuit diagram of part of the circuitry shown in FIG. 1 incorporating a fourth modification thereof.

Referring now to FIG. 5 of the drawings, this shows a fourth modification of the embodiment in which the diode 41 shown in FIG. 1 is replaced by a NPN transistor 85. Thus the junction 22 is connected to the base 86 of the NPN transistor 85. The collector 87 of the transistor 85 is connected through a resistor 88 to a positive line 89. The emitter 90 of the transistor 85 is connected to the input terminal 45 of the diode 46, and also through a resistor 91 to a negative line 92. The remainder of this part of the circuitry is reproduced in FIG. 5 and is the same as that of FIG. 1. The resistor 91 and negative line 92 form a constant current drain for the transistor 85.

The NPN transistor 85 has the same function as that of the diode 41 in that it acts to provide a voltage drop after the junction 22 when the by-pass transistor 61 is operating to short-circuit the charging pulses to the capacitor 5. In this way, the diode 46 is reverse-biassed to prevent any further effect upon the charge stored on the capacitor 5. When the gate is not being operated, ie the terminal 63 is not energised, the NPN transistor 85 also has the function of amplifying the current which is available to charge the capacitor 5, and in this way the speed of response of the whole circuitry can be increased. The use of this and the other modifications described herein can improve the response of the embodiment so that it can operate with pulses of a duration as low as 150 nanoseconds.

Although the description above has referred to the voltage following of positive-going pulses, the current amplifying transistors being of the PNP type, and the field effect transistors being of the P-channel type, it will be readily appreciated by the man skilled in the art that, with some attendant modifications of the circuitry, negative-going pulses can be followed using NPN current amplifying transistors instead of PNP current amplifying transistors, and vice versa, in which case it is necessary to use N-channel field effect transistors.

I claim:

1. A voltage follower comprising a first field effect transistor of which the gate is to receive the voltage to be monitored, a second field effect transistor which is matched with the first field effect transistor, a constant current generator connected to a coupling between the sources of the field effect transistors, a first current amplifying transistor of which the base is controlled by the drain of the first field effect transistor, a second current amplifying transistor which is matched with the first current amplifying transistor and of which the base is controlled by the drain of the second field effect transistor, a common current supply to the coupled emitters of the first and second current amplifying transistors, a pair of emitter follower transistors supplementing the first and second current amplifying transistors, the emitters of the emitter follower transistors being connected to a common and constant voltage through respective and equal resistors, a capacitor of which one terminal is connected to a constant voltage and of which the other terminal is connected to the gate of the second field effect transistor and is connected through a diode to be charged by the collector of the first current amplifying transistor, a current drain connected to the collector of the first current amplifying transistor, a connection from the collector of the second current amplifying transistors to a voltage of lower magnitude than or of the opposite sense to the voltages of the emitter or base of the second current amplifying transistor, and means for measuring the voltage developed across the capacitor.

2. A voltage follower according to claim 1 wherein the base of each current amplifying transistor is also connected to a more positive voltage through respective and equal resistors.

3. A voltage follower according to claim 1 wherein means are provided to balance the coupled field effect transistors and their respective resistors.

4. A voltage follower according to claim 3 wherein said balancing is provided by the use of a potentiometer of which the slider is connected to a positive supply and the opposite ends of the resistance track are coupled to the equal resistors.

5. A voltage follower according to claim 1 wherein said pair of emitter follower transistors are PNP transistors and said common and constant voltage to which their emitters are connected is more positive than that of the bases of the first and second current amplifying transistors.

6. A voltage follower according to claim 1 wherein the connection between the diode and the collector of the first current amplifying transistor is also connected to earth through a by-pass NPN transistor of which the base can be energised to provide conductivity and therefore by-pass charging pulses to the capacitor.

7. A voltage follower according to claim 6 wherein means are provided for reducing the magnitude of the charging pulse between the connection to the by-pass transistor and the diode whereby upon operation of the by-pass transistor, the diode is always presented with a negative signal to provide reverse-biassing.

8. A voltage follower according to claim 7 wherein said means for reducing the magnitude of the charging pulse is a diode.

9. A voltage follower according to claim 7 wherein said means for reducing the magnitude of the charging pulse is a further NPN current amplifying transistor of which the base is connected to the collector of the first current amplifying transistor, the emitter is connected to the diode, and the collector is connected to a positive voltage greater than the voltage of the emitters of the first and second current amplifying transistors.

10. A voltage follower according to claim 9 wherein the emitter of the further NPN current amplifying transistor is connected through a current drain to a negative voltage to maintain the emitter negative when the by-pass transistor is conductive.

11. A voltage follower according to claim 1 wherein said pair of emitter follower transistors are NPN transistors and said common and constant voltage to which their emitters are connected is more negative than that of the bases of the first and second current amplifying transistors.

* * * * *